(12) United States Patent
Sakamoto et al.

(10) Patent No.: US 12,384,240 B2
(45) Date of Patent: Aug. 12, 2025

(54) VEHICLE FRONT BODY STRUCTURE

(71) Applicant: Mazda Motor Corporation, Hiroshima (JP)

(72) Inventors: Toshio Sakamoto, Hiroshima (JP); Kazuto Ishii, Hiroshima (JP); Yusaku Yamaguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 701 days.

(21) Appl. No.: 17/741,454

(22) Filed: May 11, 2022

(65) Prior Publication Data

US 2022/0379965 A1 Dec. 1, 2022

(30) Foreign Application Priority Data

May 25, 2021 (JP) .................. 2021-087814

(51) Int. Cl.
| B60K 11/08 | (2006.01) |
| B60K 11/04 | (2006.01) |
| B60R 19/34 | (2006.01) |
| B62D 21/15 | (2006.01) |

(52) U.S. Cl.
CPC .............. B60K 11/08 (2013.01); B60K 11/04 (2013.01); B60R 19/34 (2013.01); B62D 21/152 (2013.01)

(58) Field of Classification Search
CPC ....... B60K 11/04; B60K 11/08; B60K 11/085; B60R 19/02; B60R 19/34; B62D 25/084; B62D 25/085
USPC ............................. 296/187.09, 193.09, 193.1
See application file for complete search history.

(56) References Cited

U.S. PATENT DOCUMENTS

| 6,622,808 | B2 * | 9/2003 | Sasano | B60K 11/04 |
| | | | | 180/68.6 |
| 8,403,403 | B2 * | 3/2013 | Tashiro | B60R 19/02 |
| | | | | 296/193.09 |
| 8,931,828 | B2 * | 1/2015 | Townson | B62D 25/084 |
| | | | | 293/115 |
| 10,226,994 | B2 * | 3/2019 | Roussel | B60K 11/08 |
| 10,562,389 | B2 * | 2/2020 | Vacca | B60K 11/085 |
| 10,899,395 | B2 * | 1/2021 | Yoo | B60R 19/03 |
| 2008/0308333 | A1 * | 12/2008 | Kapadia | B60R 19/12 |
| | | | | 293/115 |
| 2014/0132033 | A1 * | 5/2014 | Townson | B62D 27/06 |
| | | | | 296/193.1 |
| 2019/0143920 | A1 * | 5/2019 | Nakamoto | B60K 11/04 |
| | | | | 296/193.09 |

FOREIGN PATENT DOCUMENTS

EP   1266818 A2 * 12/2002   ............. B60R 19/12
JP   2007-91061 A   4/2007

* cited by examiner

*Primary Examiner* — Jason S Daniels
(74) *Attorney, Agent, or Firm* — XSENSUS LLP (57) ABSTRACT

A vehicle front body structure includes a duct member that surrounds a radiator on an inner side in a vehicle width direction of a right and left pair of crash cans. The duct member is a member that completely surrounds the radiator and includes side duct sections and an upper duct section. The side duct sections and the upper duct section are connected such that, when the duct member receives a specified load from a bumper member of a body during a frontal collision, the side duct sections and the upper duct section are disengaged from each other in the engagement sections.

8 Claims, 10 Drawing Sheets

VEHICLE FRONT BODY STRUCTURE

CROSS-REFERENCE TO RELATED APPLICATION

The present application claims priority to Japanese Patent Application 2021-087814, filed Nay 25, 2021, the entire contents of which are incorporated herein by reference.

BACKGROUND

Field

The present disclosure relates to a vehicle front body structure and, in particular, to a vehicle front body structure including: a right and left pair of crash cans; a radiator provided on an inner side in a vehicle width direction of these crash cans; and a duct member that surrounds the radiator on the inner side in the vehicle width direction of the crash cans.

Description of the Related Art

Conventionally, in order to introduce air into a heat exchanger (a radiator or the like), which is provided in an engine compartment of a vehicle, to improve cooling capacity, such a structure has been known that is provided with a duct member for surrounding the heat exchanger and extending forward, so as to completely surround the heat exchanger (for example, Patent document 1).

PRIOR ART DOCUMENTS

Patent Documents

[Patent document 1] JP-A-2007-91061

SUMMARY

Technical Problems

Here, in the case where the duct member that completely surrounds the heat exchanger is provided as in Patent document 1, the air that has been introduced into a front bumper can flow linearly toward the heat exchanger. In this way, the cooling capacity of the heat exchanger can be improved. Furthermore, since the air flows linearly in the front bumper, aerodynamic drag of the vehicle can also be improved. For such a reason, it is useful to provide the duct member in the front bumper so as to rectify the air.

In order to cause the air to flow linearly toward the heat exchanger, such a duct structure that completely surrounds the heat exchanger as in Patent document 1 is preferably adopted. However, in the case where the duct member as a highly-rigid integral structure that completely surrounds the heat exchanger is provided, it is concerned that the duct member hinders deformation of a crash can during a frontal collision.

Due to such concern, as a rectification structure in the front bumper, a plane member that partially surrounds the heat exchanger for rectification is generally provided to ensure collision performance, instead of adopting the highly-rigid duct member that completely surrounds the heat exchanger as described above.

Meanwhile, in order to improve cooling performance of the heat exchanger, the present inventors have keenly studied a body structure capable of satisfying the requested collision performance while adopting the duct structure that completely surrounds the heat exchanger.

In view of the above, the present disclosure has been made to solve the above-described problem and therefore has a purpose of providing a vehicle front body structure capable of simultaneously improving cooling performance by a heat exchanger and exerting collision performance of a vehicle.

Means for Solving the Problems

In order to solve the above-described problem, the present disclosure is a vehicle front body structure including: a right and left pair of crash cans, each of which extends in a vehicle longitudinal direction; a radiator that is provided on an inner side in a vehicle width direction of the right and left pair of these crash cans; and a duct member that surrounds the radiator on the inner side in the vehicle width direction of the right and left pair of crash cans. The duct member is a member that completely surrounds the radiator and has a vertical wall section and a transverse wall section. The vertical wall section and the transverse wall section of the duct member have at least one engagement section in which those vertical wall section and transverse wall section are engaged with and connected to each other. The vertical wall section and the transverse wall section of the duct member are connected such that, when the duct member receives a specified load from a bumper member of a body during a frontal collision, the vertical wall section and the transverse wall section are disengaged from each other in the at least one engagement section.

According to the present disclosure that is configured as described above, since the duct member completely surrounds the radiator, it is possible to ensure an air flow toward a heat exchanger. In addition, when a collision load is input from the front, the vertical wall section and the transverse wall section of the duct member are disengaged from each other in the at least one engagement section. Thus, it is possible to reduce strength of the duct member against the load from the front of the vehicle, and thereby deformation of the crash can is not hindered during the frontal collision. As the result of these, the present disclosure can simultaneously improve cooling performance by the heat exchanger and exert collision performance of the vehicle.

In the present disclosure, preferably, the transverse wall section of the duct member is formed with at least one notch that is opened rearward, and the at least one engagement section is configured by engaging a part of the vertical wall section with the notch of the transverse wall section.

According to the present disclosure that is configured as described above, the part of the vertical wall section is engaged with the notch, which is opened rearward, in the transverse wall section in the at least one engagement section. Thus, when the vertical wall section receives the collision load from the front, the vertical wall section is displaced rearward in the vehicle relative to the transverse wall section, and is disengaged from the notch of the transverse wall section. In this way, it is possible to further effectively reduce the strength of the duct member against the load from the front of the vehicle.

In the present disclosure, preferably, the vertical wall section of the duct member has a frame section and an inner surface section having lower strength than this frame section. In the at least one engagement section, a part of the frame section of the vertical wall section is connected to the transverse wall section in a manner to be disengaged therefrom.

According to the present disclosure that is configured as described above, when the vertical wall section receives the collision load from the front, the frame section, which is a part of a side of the duct member, in the vertical wall section is deformed. In this way, is possible to effectively reduce the strength of the duct member against the load from the front of the vehicle. In particular, since the inner surface section has the lower strength than the frame section, it is possible to suppress the inner surface section from hindering the deformation of the frame section.

In the present disclosure, preferably, the vertical wall section of the duct member is formed with a recessed section, and the recessed section is formed with a ridgeline that extends outward in the vehicle width direction.

According to the present disclosure that is configured as described above, when the vertical wall section receives the collision load from the front during the frontal collision, such a load is transmitted outward in the vehicle width direction along the ridgeline of the recessed section. In this way, the vertical wall section can be deformed outward in the vehicle width direction to have a V-shape. Along with such deformation, the vertical wall section and the transverse wall section can further effectively be disengaged from each other in the at least one engagement section.

In the present disclosure, preferably, the bumper member of the body includes a bumper reinforcement that extends in the vehicle width direction on a front surface of a vehicle, and in a vehicle vertical direction of the vertical wall section, the recessed section of the vertical wall section in the duct member is formed at substantially the same height position as the bumper reinforcement.

According to the present disclosure that is configured as described above, it is possible to effectively transmit the collision load, which is input from the bumper reinforcement, to the recessed section of the vertical wall section. In this way, the vertical wall section can further reliably be deformed outward in the vehicle width direction to have the V-shape.

Advantages

The vehicle front body structure of the present disclosure can simultaneously improve the cooling performance by the heat exchanger and exert the collision performance of the vehicle.

DESCRIPTION OF EMBODIMENTS

A description will hereinafter be made on a vehicle front body structure according to an embodiment of the present disclosure with reference to the accompanying drawings.

Figure 1:
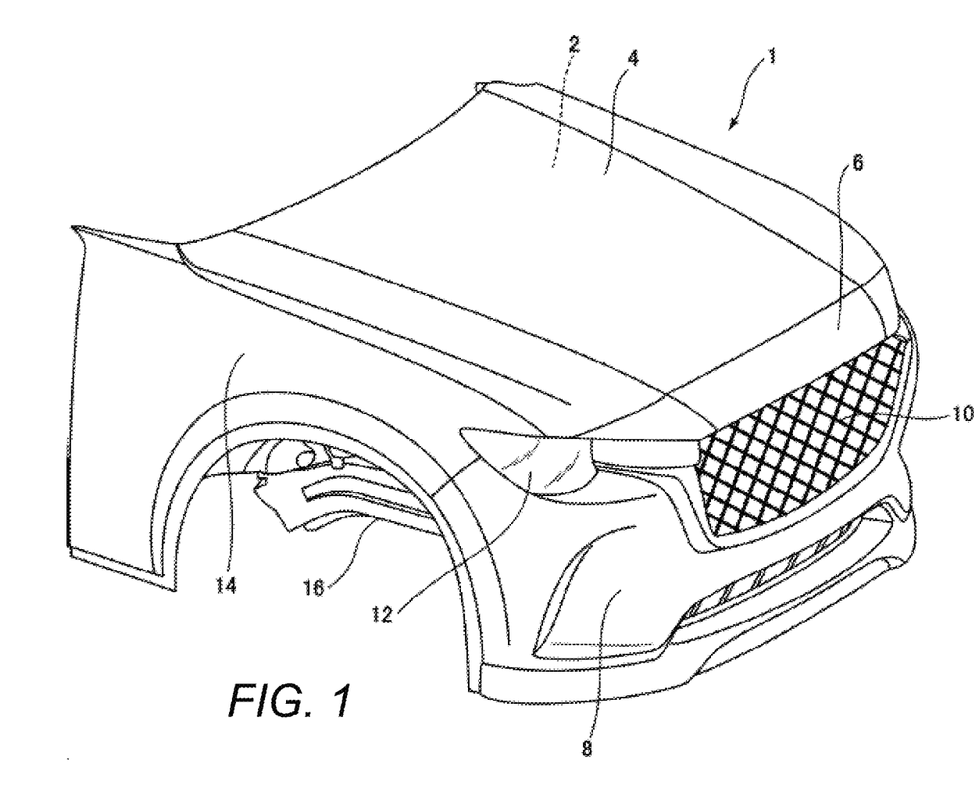
FIG. 1 is a perspective view in which a front portion of a vehicle having a vehicle front body structure according to an embodiment of the present disclosure is seen obliquely downward from a vehicle right side.
Figure 2:
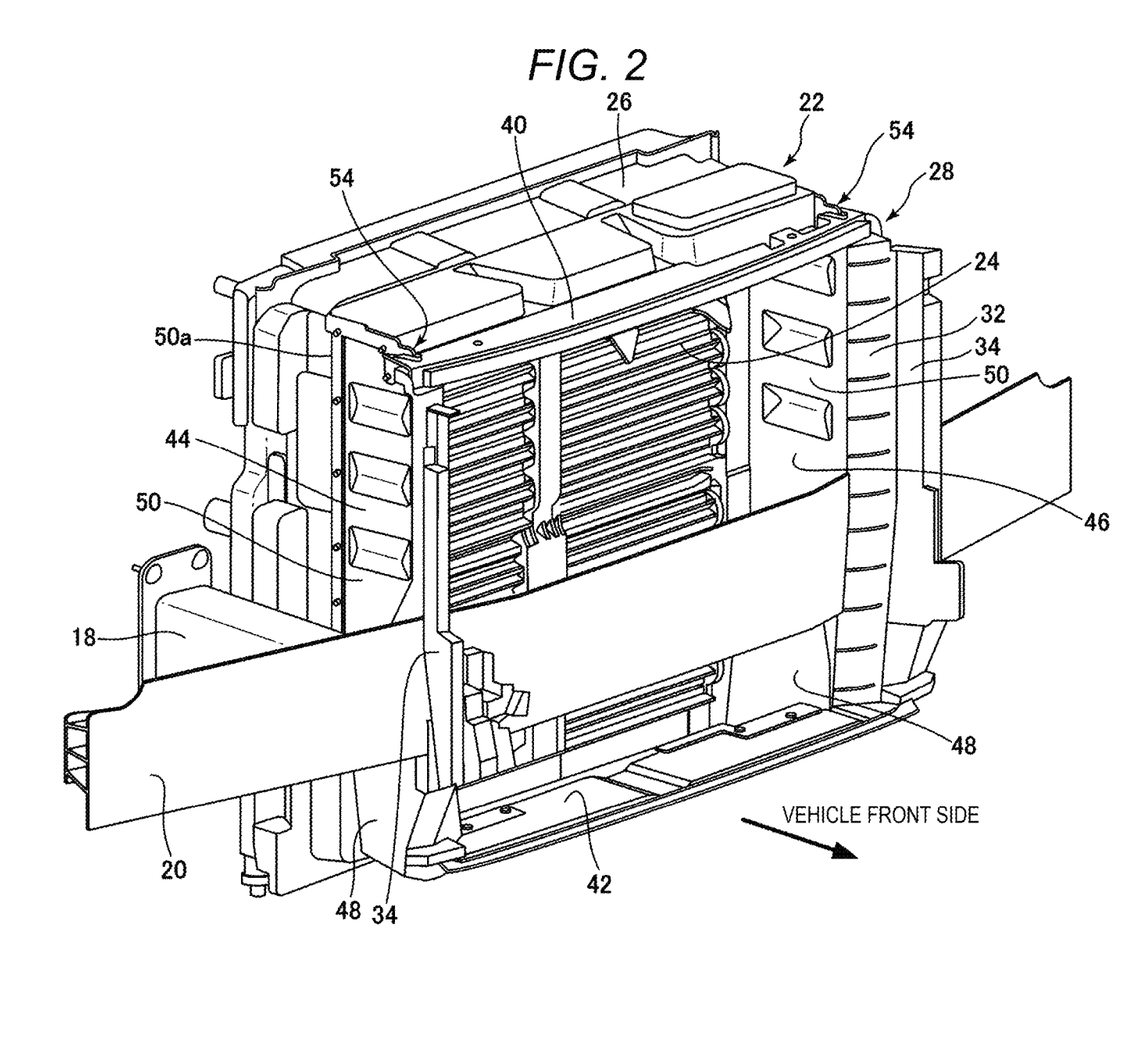
FIG. 2 is a perspective view in which a radiator, a radiator duct, and a body shock absorbing member provided in the vehicle front body structure according to this embodiment are seen obliquely downward from the vehicle right side.

First, a description will be made on the vehicle front body structure according to the embodiment of the present disclosure with reference to FIG. 1 and FIG. 2. FIG. 1 is a perspective view in which a front portion of a vehicle having the vehicle front body structure according to the embodiment of the present disclosure is seen obliquely downward from a vehicle right side. FIG. 2 is a perspective view in which the vehicle front body structure according to this embodiment is seen obliquely downward from the vehicle right side.

First, as illustrated in FIG. 1, a vehicle 1 having the vehicle front body structure according to the embodiment of the present disclosure includes, in a front portion thereof: a hood 4 that covers an engine compartment 2; an upper grille panel 6 that extends in a vehicle width direction on a front side of the hood 4; a bumper fascia 8 that is provided below this upper grille panel 6 and on a front surface of the vehicle 1; a front grille 10 that is provided between the upper grille panel 6 and the bumper fascia 8; a headlamp unit 12 that is arranged on each of right and left sides of this front grille 10 and is arranged in a portion above the bumper fascia 8; and a front fender 14 that is provided on each of right and left sides of the hood 4 and is arranged on a lateral surface of the vehicle.

Next, as illustrated in FIG. 2, the vehicle 1 includes, as frame members constituting a body: a right and left pair of front side frames 16, each of which extends in a vehicle longitudinal direction of the engine compartment 2; a crash can 18 as a shock absorbing member that is provided to a front end portion of each of these front side frames 16; and a bumper reinforcement 20 that is attached to front end Portions of these crash cans 18 and extends in the vehicle width direction to receive a load during a frontal collision.

In addition, in the front portion of the vehicle 1, a right and left pair of apron members is provided on an upper side and both of right and left sides of the engine compartment 2, and extends in the vehicle longitudinal direction. Each of the apron members has a tip portion that is curved inward in the vehicle width direction, and such tip portions are connected to each other via an upper shroud member.

At a position below the upper shroud member, a radiator 22 is provided to cool an engine with air that is introduced thereinto through the front grille 10. This radiator 22 is provided with: a grille shutter 24 that is provided on a front surface thereof; and a radiator shroud 26 that extends in a rectangular shape so as to cover a radiator core 36, which will be described below and illustrated in FIG. 4, a cooling fan 38 of the radiator core 36, and the like.

A duct member 28 that extends in a rectangular shape in front of the radiator 22 is connected to a front end portion of this radiator shroud 26. As will be described below, the radiator 22 is completely surrounded by the duct member 28 along with the radiator shroud 26. The radiator 22, the radiator shroud 26, and the duct member 28 are provided on an inner side in the vehicle width direction of the right and left crash cans 18. Here, the radiator shroud 26 and the duct member 28 may integrally be molded to have such a configuration that does not hinder deformation of the duct member 28, which will be described below.

Figure 9A:
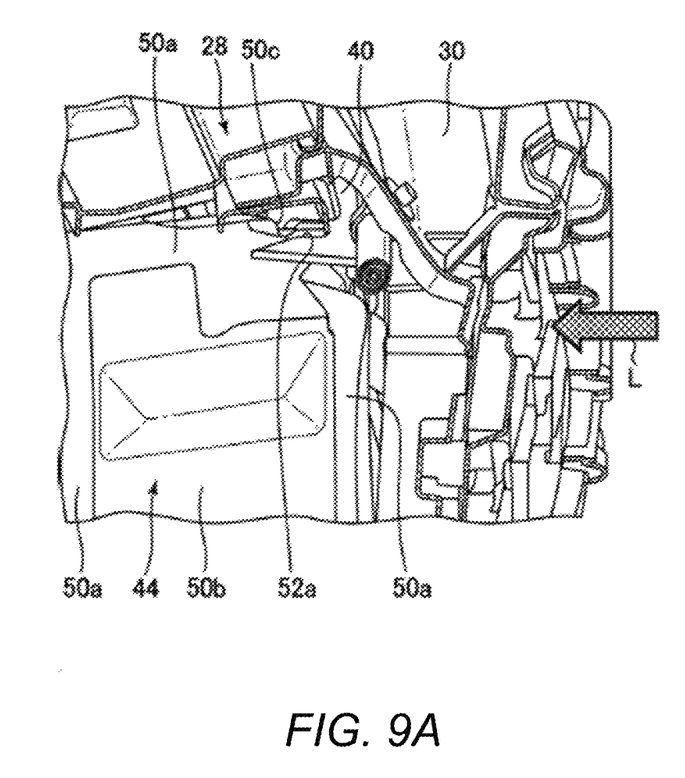
FIGS. 9A and 9B include partial enlarged perspective views, each of which illustrates an exemplary deformation state of the duct member caused by load input from front of the vehicle to the vehicle having the vehicle front body structure according to this embodiment in an early phase of a collision.
Figure 9B:
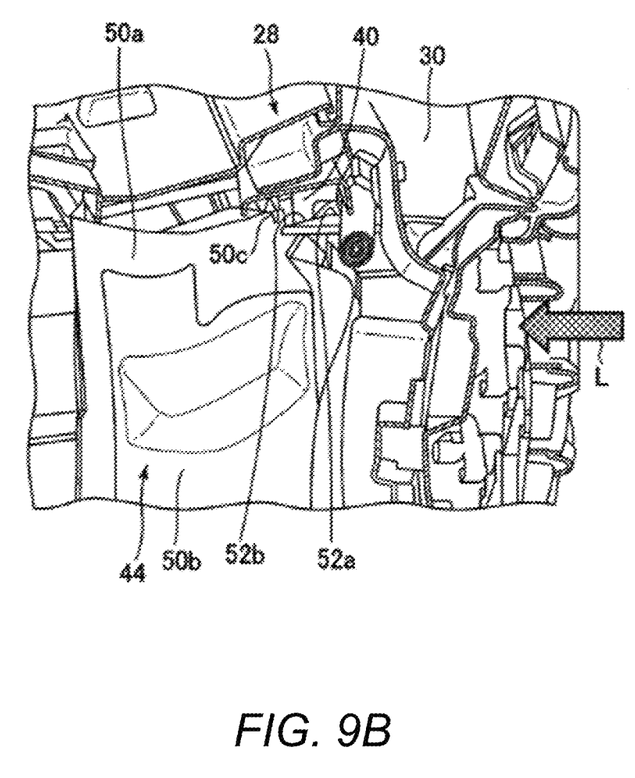
Figure 10:
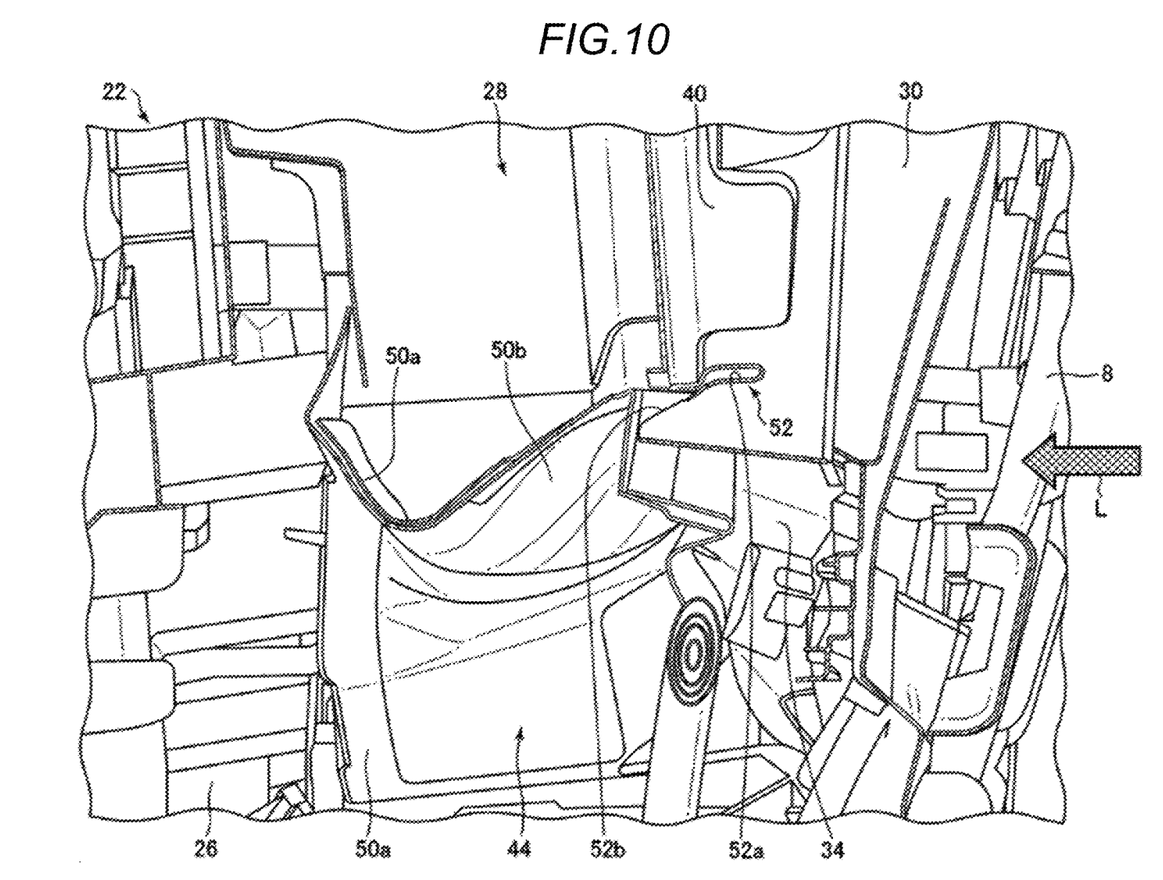
FIG. 10 is a partial enlarged perspective view for illustrating a deformation state of the side duct section at the time when the side duct section and the upper duct section of the duct member according to this embodiment are disengaged from each other.

Next, the vehicle 1 includes a grille reinforcement 30 (denoted by a reference sign 30 in FIGS. 9A and 9B and FIG. 10). The grille reinforcement 30 is attached to an unillustrated support bracket on the body side, and the like, and mainly supports and reinforces the bumper fascia 8 and the front grille 10. This grille reinforcement 30 is a member that is provided on an inner side of the bumper fascia 8 and the front grille 10 illustrated in FIG. 1 and extends along the bumper fascia 8 and the front grille 10. In this embodiment, this grille reinforcement 30 and the bumper reinforcement 20 primarily function as bumper members that receive a shock from an obstacle (another vehicle, an upper limb portion of a pedestrian, or the like) in front of the vehicle.

Next, a pair of load transmission members 32 is provided on a rear side of the grille reinforcement 30 and a front side of the bumper reinforcement 20, and extends vertically in a manner not to hinder an air flow into the radiator 22. As will be described below, each of these load transmission member 32 is provided as an abutment member that abuts the duct member 28 in an early phase of the collision, and plays a role of transmitting the load to the duct member 28 when the collision load is applied to the grille reinforcement 30.

A seal member 34 is attached to each of the load transmission members 32, and has a function of sealing the respective load transmission member 32 and the grille reinforcement 30. The load transmission members 32 are fixed to the grille reinforcement 30 via these seal members 34. As will be described below, each of these seal members 34 also plays the role of transmitting the load to the duct member 28 in the early phase of the collision. The seal members 34 and the load transmission members 32 are attached to such a grille reinforcement 30.

Furthermore, as will be described below, the bumper reinforcement 20 also plays the role of transmitting the load to the duct member 28 in the early phase of the collision.

Figure 3:
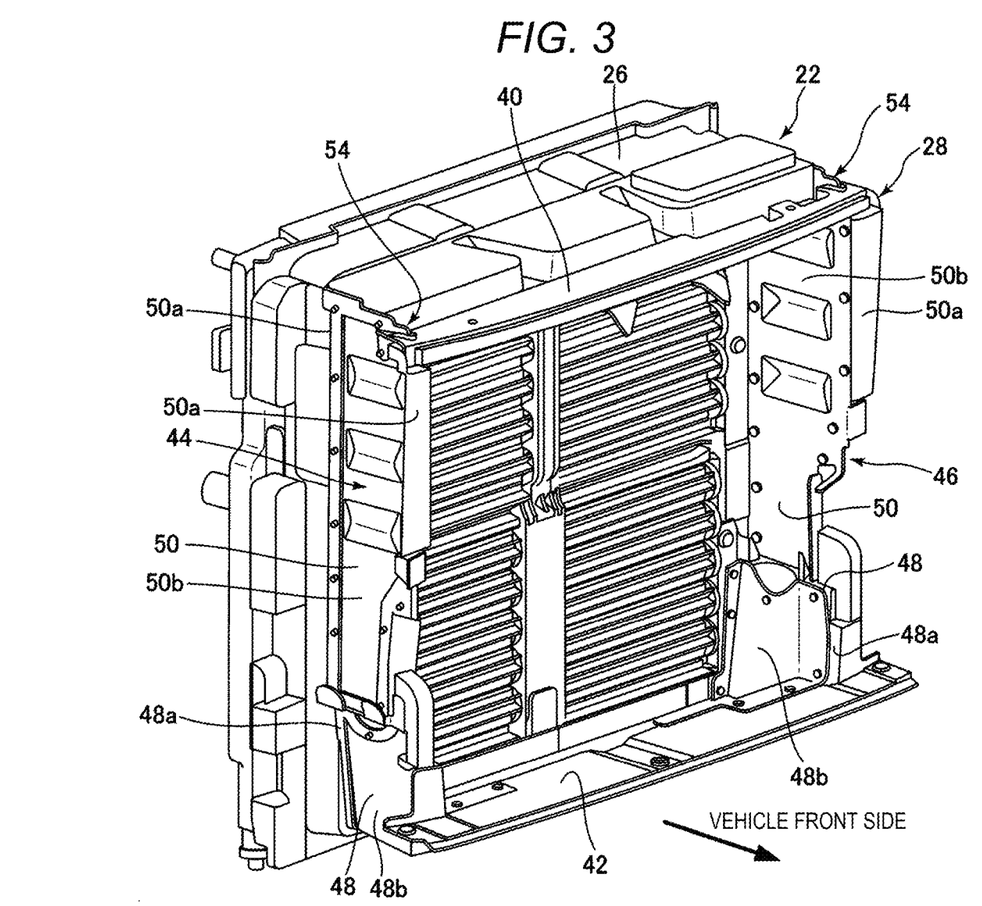
FIG. 3 is a perspective view illustrating the radiator illustrated in FIG. 2 and a duct member.
Figure 4:
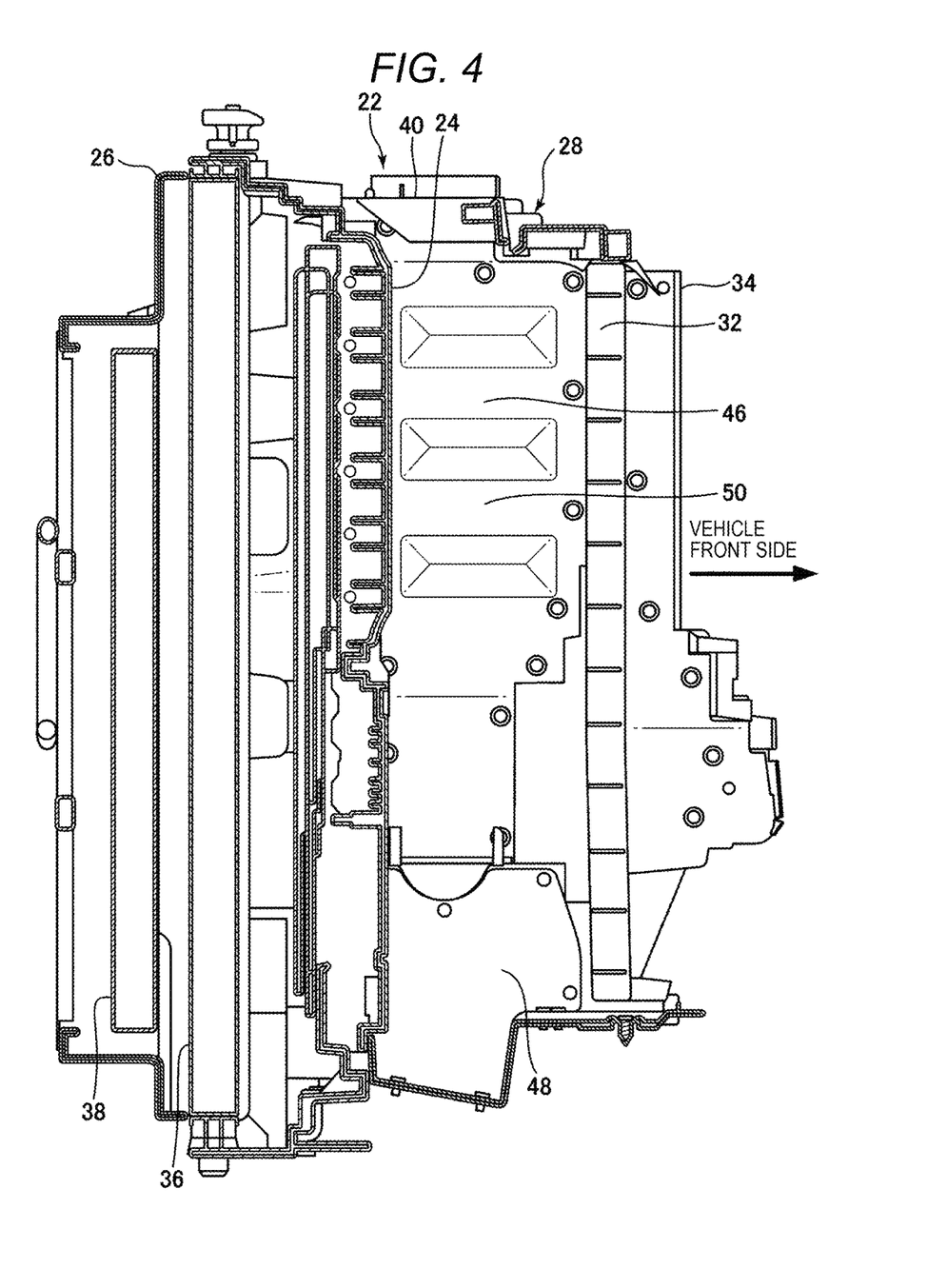
FIG. 4 is a partial cross-sectional side view illustrating the radiator and the duct member illustrated in FIG. 3.

Next, a description will be made on configurations of the radiator 22 and the duct member 28 with reference to FIG. 3 and FIG. 4. FIG. 3 is a perspective view illustrating the radiator and the duct member illustrated in FIG. 2. FIG. 4 is a partial cross-sectional side view illustrating the radiator and the duct member illustrated in FIG. 3. FIG. 4 is a view illustrating cross sections of central portions in the vehicle width direction of the radiator and the duct member illustrated in FIG. 3, and is a view of a state where an inner surface of a left side duct section of the duct member is visible.

First, as illustrated in FIG. 4, the radiator 22 includes the grille shutter 24, the radiator core 36, the cooling fan 38, and the like. As illustrated in FIG. 3 and FIG. 4, the radiator shroud 26 accommodates this radiator 22.

Together with the radiator shroud 26, the duct member 28 is provided to completely surround the radiator 22. In this embodiment, the duct member 28 extends to completely surround the radiator 22, so as to completely cover at least the grille shutter 24 of the radiator 22.

Next, as illustrated in FIG. 3, the duct member 28 has: an upper duct section (an upper transverse wall section) 40 on an upper surface thereof; a lower duct section (a lower transverse wall section) 42 on a lower surface thereof; and side duct sections (vertical wall sections) 44, 46 on both of lateral surfaces in the vehicle width direction thereof. The side duct sections 44, 46 extend in a vehicle vertical direction in a manner to connect both of edge portions (both of right and left edge portions) in the vehicle width direction of the upper duct section 40 and the lower duct section 42.

First, the upper duct section 40 is configured as a resin member that continuously extends from a front end portion of an upper surface of the radiator shroud 26. The lower duct section 42 is configured as a resin member that continuously extends from a front end portion of a lower surface of the radiator shroud 26. Members constituting this lower duct section 42 include lower side sections 48 that extend upward in the vehicle from both of edge portions in the vehicle width direction of the lower duct section 42. These lower side sections 48 constitute parts near lower edge portions of the side duct sections (the vertical wall sections) 44, 46.

Next, as illustrated in FIG. 3, each of the side duct sections 44, 46 has the above-described lower side section 48 and an upper side section 50 on top of the lower side section 48.

First, each of the right and left lower side sections 48 has a frame section 48a that is made of a resin, continues from respective one of the right and left edge portions of the above-described lower duct section 42, and extends along an outer edge portion of the lower side section 48. An inner surface section 48b of each of these frame sections 48a is constructed of a plane member that is made of rubber and has lower strength than the resin frame section 48a. This rubber-made inner surfaces 48b is attached to the frame section 48a by clipping a peripheral edge portion of the inner surfaces 48b to the frame section 48a (also see an enlarged view in FIG. 6).

Next, as illustrated in FIG. 3, each of the right and left upper side sections 50 has a frame section 50a that is made of the resin and extends along an outer peripheral edge of the respective upper side section 50. Each of these resin frame sections 50a is formed of a different member from the resin member that constitutes the upper duct section 40. However, the upper duct section 40 and the frame section 50a of the upper side section 50 may be formed of an integrally-molded resin member. An inner surface 50b of each of these frame sections 50a is constructed of a plane member that is made of the rubber and has lower strength than the respective resin frame section 50a. This rubber-made plane member 50b is attached to the frame section 50a by clipping a peripheral edge portion of the plane member 50b to the frame section 50a (also see an enlarged view in FIG. 5).

Here, as illustrated in FIG. 2, the load transmission members 32 and the seal members 34 described above are provided at positions that are located below the upper duct section 40 and above the lower duct section 42 and oppose front end portions of the side duct sections 44, 46. In this way, as will be described below, when the load is transmitted from the grille reinforcement 30 in the early phase of the collision, the load transmission members 32 and the seal members 34 transmit the load to the side duct sections 44, 46, and thereby promote the deformation of the duct member 28.

Figure 5:
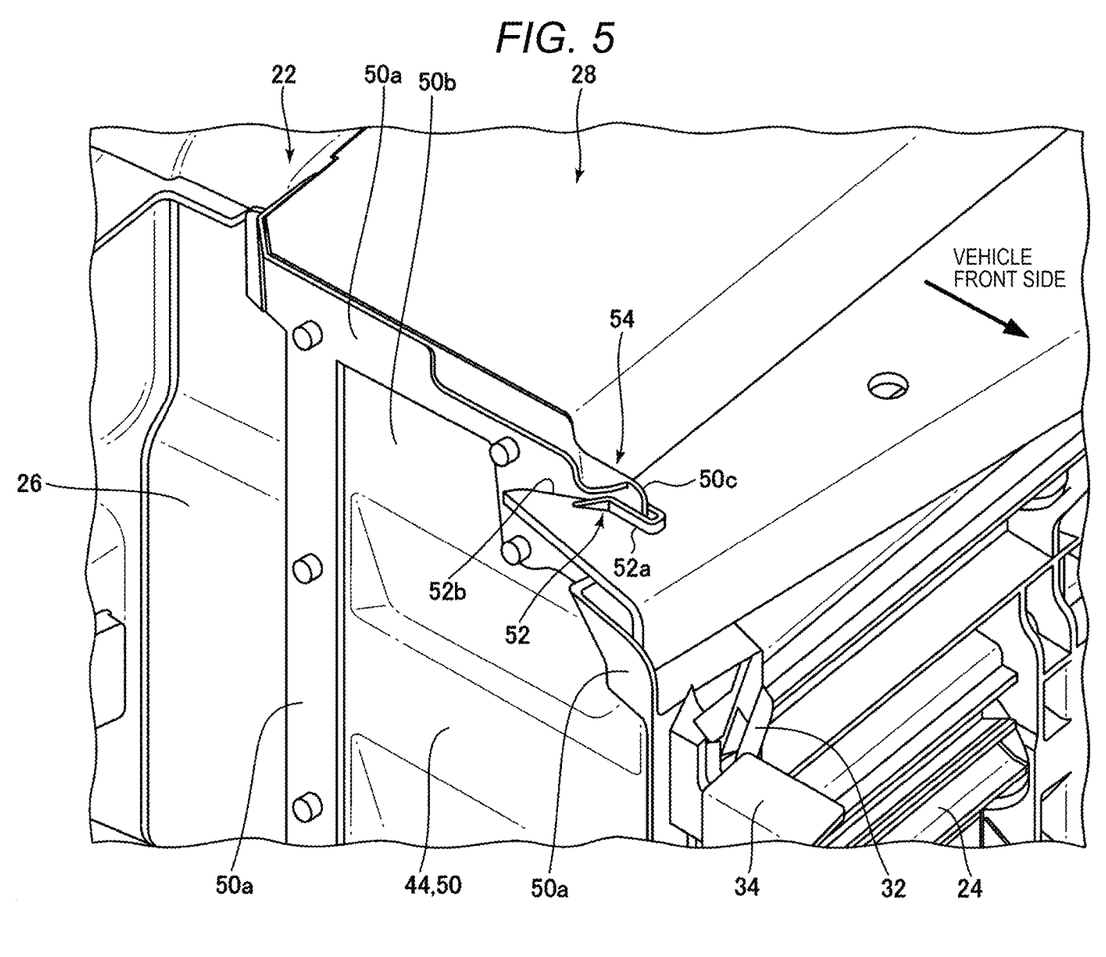
FIG. 5 is a partial enlarged perspective view enlarging an engagement section between a side duct section and an upper duct section of the duct member illustrated in FIG. 3.

Next, a description will be made on a coupling structure (a first deformation promoting structure) between the upper duct section 40 and each of the side duct sections 44, 46 and in the duct member 28 with reference to FIG. 3 and FIG. 5. FIG. 5 is a partial enlarged perspective view enlarging an engagement section between the side duct section and the upper duct section of the duct member illustrated in FIG. 3.

As illustrated in FIG. 3 and FIG. 5, a notch 52 is formed in each of right and left edge portions of the upper duct section 40, and is opened rearward in the vehicle.

An engagement vertical wall portion 50c, as a part of the resin member constituting the upper side section 50, is fitted into a front portion 52a of each of these notches 52. This front portion 52a extends in the vehicle longitudinal direction with a constant width such that the upper side section 50 is engaged with the upper duct section 40 at this position until the load in a specified amount or larger is applied.

Meanwhile, a rear portion 52b of the notch 52 is notched obliquely outward in the vehicle width direction so as to guide rearward movement and deformation of the upper side section 50 at the time when respective one of the side duct sections 44, 46 moves rearward with respect to the upper duct section 40 as will be described below.

Here, the notch 52 and the engagement vertical wall portion 50c, as the part of the upper side section 50 engaged with the notch 52, constitute an engagement section 54 between the upper duct section (the transverse wall section) 40 and respective one of the side duct sections (the vertical wall sections) 44, 46. In detail, the notch 52 and the engagement vertical wall portion 50c constitute the engagement section 54 between the upper duct section 40 and the upper side section 50.

In this embodiment, as will be described below, in the early phase of the collision, the upper duct section (the transverse wall section) 40 and each of the side duct sections (the vertical wall sections) 44, 46 are disengaged from each other in such an engagement section 54, and the deformation of the duct member 28 is thereby promoted.

In this embodiment, the engagement sections 54 are provided at two right and left positions above the duct member 28. However, as a modified example, one of the engagement sections 54 may be formed in the same manner, and the other thereof may be formed to have a fixing structure that hinders the load transmission during the collision. Alternatively, the engagement sections 54 may be provided below the duct member 28.

Figure 6:
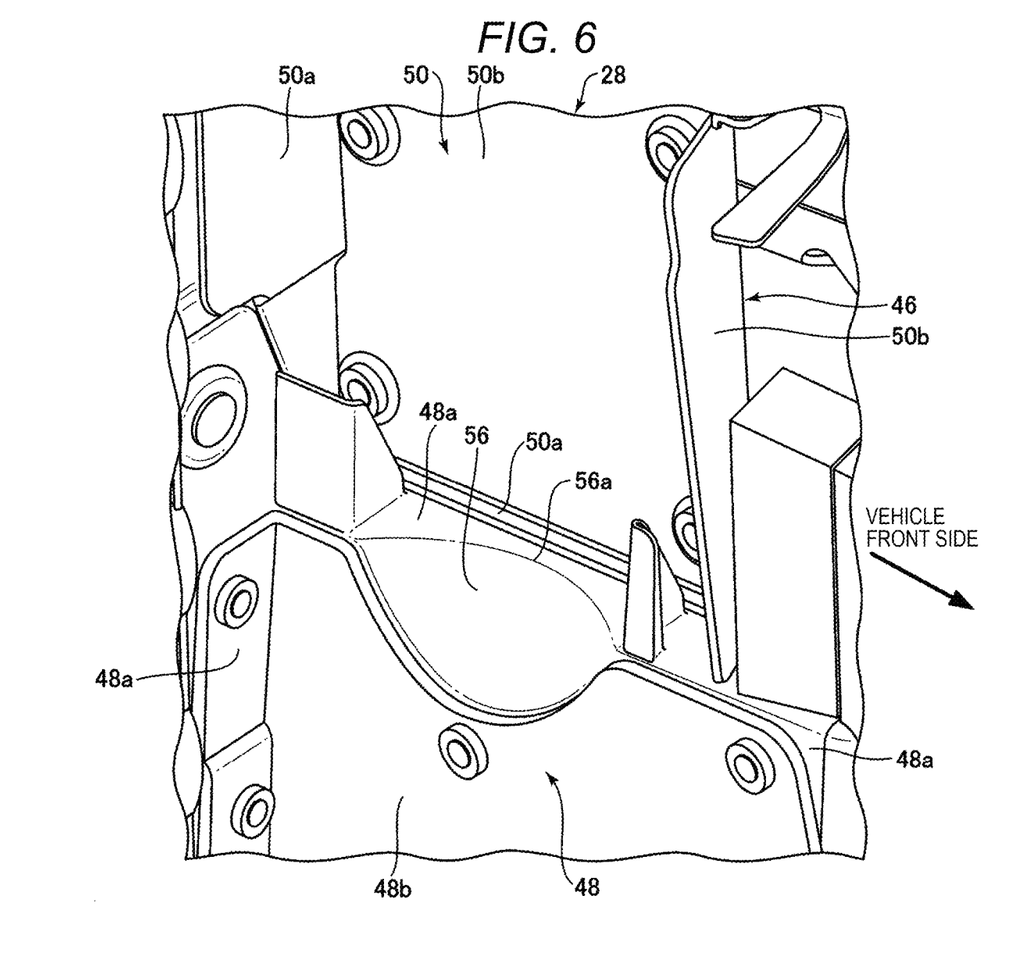
FIG. 6 is a partial enlarged perspective view enlarging a recessed section that is formed in the side duct section of the duct member illustrated in FIG. 3.
Figure 7:
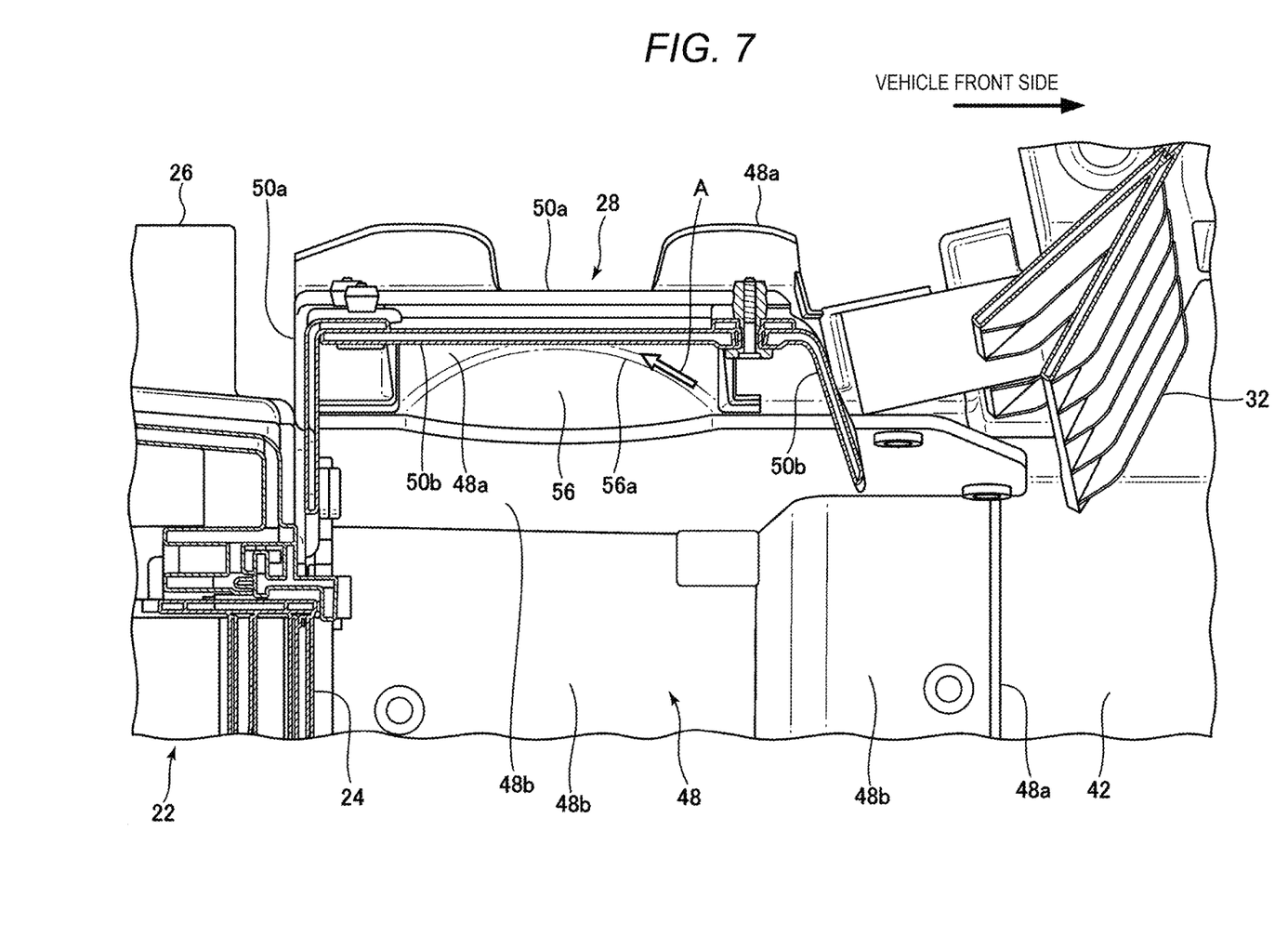
FIG. 7 is a partial enlarged plan view in which the side duct section and the recessed section illustrated in FIG. 6 are seen from above.

Next, a description will be made on a structure (a second deformation promoting structure) of the lower side section 48 in each of the side duct sections 44, 46 with reference to FIG. 3, FIG. 6, and FIG. 7. FIG. 6 is a partial enlarged perspective view enlarging a recessed section that is formed in the side duct section of the duct member illustrated in FIG. 3. FIG. 7 is a partial enlarged plan view in which the side duct section and the recessed section illustrated in FIG. 6 are seen from above.

First, as illustrated in FIG. 3, FIG. 6, and FIG. 7 in each of the side duct sections 44, 46, the resin frame section 48a of the lower side section 48 is formed with a recessed section 56 at a boundary position thereof with the upper side section 50. The recessed section 56 is a concave section that extends downward in the vehicle and outward in the vehicle width direction in an arc shape. As illustrated in FIG. 6 and FIG. 7, each of these recessed sections 56 is opened to the inner side in the vehicle width direction. The frame section 48a is also formed with a ridgeline 56a by the respective recessed section 56 that extends outward in the vehicle width direction.

Here, as illustrated in FIG. 6, the frame section 50a and the rubber member 50b, which is the inner surface of the frame section 50a, in the upper side section 50 extend on the outer side in the vehicle width direction of the recessed section 56.

In addition, as illustrated in FIG. 7, the frame section 50a of this upper side section 50 extends to have an L-shaped cross section on the outer side in the vehicle width direction of the recessed section 56 and a vehicle rear side thereof in a plan view. A portion on the vehicle rear side of the frame section 50a is clipped to a front surface of the radiator shroud 26. Meanwhile, the rubber member 50b as the inner surface extends to have an L-shape on the outer side in the vehicle width direction of the recessed section 56 and a vehicle front side thereof in the plan view. A portion on the outer side in the vehicle width direction of the rubber member 50b is clipped to the frame section 50a.

Figure 8:
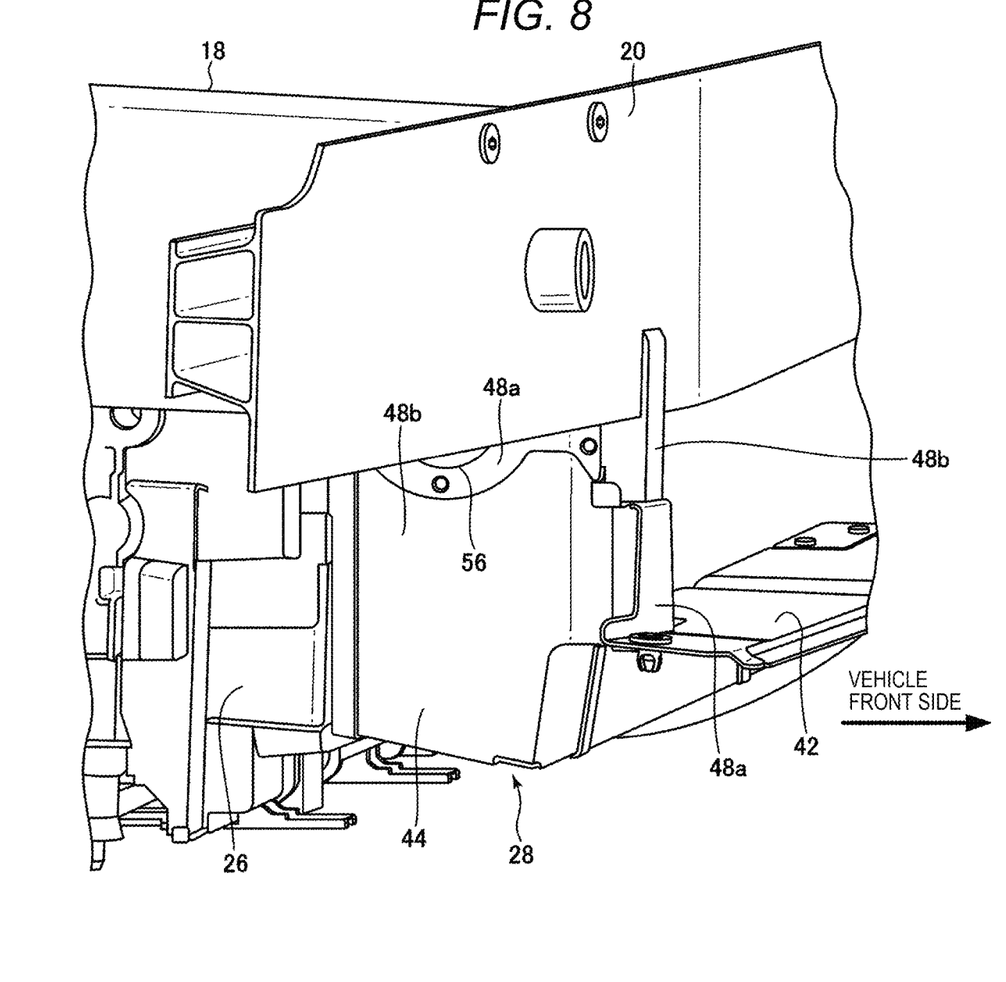
FIG. 8 is a partial enlarged perspective view enlarging a locking section of the radiator duct to the shock absorbing member according to this embodiment.

Next, a description will be made on attachment and arrangement of the side duct sections 44, 46 to the bumper reinforcement 20 with reference to FIG. 7 and FIG. 8. FIG. 8 is a partial enlarged perspective view enlarging a locking section of a radiator duct to the shock absorbing member according to this embodiment.

First, as illustrated in FIG. 8, the rubber member 50b of each of the side duct sections 44, 46 is partially locked to the bumper reinforcement 20.

In addition, as illustrated in FIG. 8, the recessed section 56 of the lower side section 48 (FIG. 8 illustrates a portion on the outer side in the vehicle width direction of the recessed section 56) is formed at substantially the same height position as the bumper reinforcement 20 in the vehicle vertical direction of each of the side duct sections 44, 46. In this way, when the bumper reinforcement 20 abuts the side duct sections 44, 46 in the early phase of the collision, the load is easily transmitted to these recessed sections 56.

In this early phase of the collision, as indicated by a reference sign A in FIG. 7, a load vector in a direction along the ridgeline 56a of the recessed section 56 is produced by the load that is transmitted to the lower side section 48. By such a load vector A, in the early phase of the collision, the lower side section 48 is deformed outward in the vehicle width direction to have a V-shape, and deformation of each of the side duct sections 44, 46 is thereby promoted.

Next, a description will be made on an exemplary deformation state of the duct member 28 in the early phase of the collision according to this embodiment and operation of this embodiment in relation to this deformation with reference to FIG. 9 and FIG. 10. FIG. 9A and FIG. 9B are partial enlarged perspective views, each of which illustrates the exemplary deformation state of the duct member caused by the load input from the front of the vehicle to the vehicle having the vehicle front body structure according to this embodiment in the early phase of the collision. FIG. 10 is a partial enlarged perspective view for illustrating a deformation state of the side duct section at the time when the side duct section and the upper duct section in the duct member according to this embodiment are disengaged from each other.

First, as illustrated in FIG. 9A and FIG. 9B, in the early phase of the collision, when the grille reinforcement 30, which arranged on the inner side of the bumper fascia 8 and the front grille 10, receives the collision load (indicated by a reference sign L in FIG. 9A and FIG. 9B) from the bumper fascia 8 and the front grille 10, the load is transmitted to the side duct sections 44, 46 of the duct member 28 via the load transmission members 32 and the seal members 34.

In the early phase of the collision, the bumper reinforcement 20 also receives the collision load (the load L), and the collision load is transmitted to the side duct sections 44, 46 of the duct member 28.

A force that attempts to displace each of the side duct sections 44, 46, which have received such a load, rearward in the vehicle with respect to the upper duct section 40 is applied thereto. First, as illustrated in FIG. 9A, such a force disengages the upper side section 50 in each of the side duct sections 44, 46 from the upper duct section 40 in the engagement section 54. At this time, since a rear end of the upper side section 50 is supported by the radiator shroud 26, as illustrated in FIG. 9B, the upper side section 50 is deformed in the vehicle width direction with the rear end thereof being a fulcrum.

Meanwhile, in the early phase of the collision, the lower side section 48 is deformed in a manner to be bent outward in the vehicle width direction to have a V-shape due to the effect of the ridgeline 56a of the above-described recessed section 56. Along with such deformation of the lower side section 48, a force that attempts to displace the upper side section 50 downward is applied to the upper side section 50, which is arranged on top of the lower side section 48.

Here, as described above, in the early phase of the collision, the upper side section 50 is disengaged in the engagement section 54. Thus, the bending deformation of the upper side section 50 is promoted.

In this embodiment, strength of the duct member 28 itself against the collision load is reduced, so as to promote the deformation of the side duct sections 44, 46 as described above in the early phase of the frontal collision.

Furthermore, in this embodiment, the duct member 28 is suppressed from receiving the large collision load by reducing the strength of the duct member 28, just as described. In this way, the deformation of the crash can 18 as the body-side shock absorbing member, which should be originally deformed to absorb the shock, is suppressed from being hindered.

Moreover, in this embodiment, the frame sections 48a, 50a of the side duct sections 44, 46 are made of the resin, and the inner surfaces 48b, 50b thereof are made of the rubber. Thus, the inner surfaces 48b, 50b do not hinder the deformation of the frame sections 48a, 50a, respectively.

In addition, since the inner surfaces 48b, 50b of the side duct sections 44, 46 are made of the rubber, the duct member 28 is less likely to receive the collision load in the early phase of the collision, which hinders the transmission of the collision load to the radiator 22 and the radiator shroud 26. In this way, the deformation of the crash cans 18 is suppressed from being hindered.

Next, a description will be made on effects of the front body structure of the vehicle 1 according to the embodiment of the present disclosure.

First, the front body structure of the vehicle 1 according to the embodiment of the present disclosure includes the duct member 28 that surrounds the radiator 22 on the inner side in the vehicle width direction of the right and left pair of the crash cans 18. The duct member 28 is the member that completely surrounds the radiator 22 and includes the side duct sections (the vertical wall sections) 44, 46 and the upper duct section (the transverse wall section) 40. Each of the side duct sections 44, 46 of the duct member 28 and the upper duct section 40 has the at least one engagement section 54 for the mutual engagement and connection. Each of the side duct sections 44, 46 of the duct member 28 and the upper duct section 40 are connected such that, when the duct member 28 receives the specified load from the bumper members (the bumper reinforcement 20 and the grille reinforcement 30) of the body during the frontal collision, in the at least one engagement section 54, each of the side duct sections 44, 46 and the upper duct section 40 are disengaged from each other.

According to this embodiment as described above, since the duct member 28 completely surrounds the radiator 22, it is possible to ensure the air flow toward the radiator 22 as the heat exchanger. In addition, when the collision load is input from the front, in the two right and left engagement sections 54, the side duct sections (the vertical wall sections) 44, 46 and the upper duct section (the transverse wall section) 40 in the duct member 28 are disengaged from each other. Thus, it is possible to reduce the strength of the duct member 28 against the load from the front of the vehicle. In this way, the deformation of the crash cans 18 can be suppressed from being hindered during the frontal collision. As a result, according to this embodiment, it is possible to simultaneously improve cooling performance by the heat exchanger and exert collision performance of the vehicle.

According to this embodiment, in each of the two right and left engagement sections 54, the engagement vertical wall portion 50c as a part of respective one of the side duct sections 44, 46 is engaged with the notch 52 of the upper duct section 40 that is opened rearward. Thus, when the collision load is input to each of the side duct sections 44, 46 from the front, respective one of the side duct sections 44, 46 can be displaced rearward in the vehicle relative to the upper duct section 40 and can be disengaged from the notch 52 of the upper duct section 40. In this way, it is possible to further effectively reduce the strength of the duct member 28 against the load from the front of the vehicle.

According to this embodiment, the side duct sections 44, 46 of the duct member 28 respectively have the frame sections 48a, 50a and the inner surface sections 48b, 50b with the lower strength than these frame sections 48a, 50a. The frame section 50a of each of the side duct sections 44, 46 in the two engagement sections 54 is partially connected to the upper duct section 40 in a manner capable of being disengaged therefrom. Thus, when each of the side duct sections 44, 46 receives the collision load from the front, respective one of the frame sections 48a, 50a as the part of the side of the duct member 28 is deformed. In this way, it is possible to effectively reduce the strength of the duct member 28 against the load from the front of the vehicle.

According to this embodiment, the recessed section 56 is formed with the ridgeline 56a in the manner to extend outward in the vehicle width direction. Thus, when each of the side duct sections 44, 46 receives the collision load from the front during the frontal collision, such a load is transmitted outward in the vehicle width direction along the ridgeline 56a of the recessed section 56. In this way, each of the side duct sections 44, 46 can be deformed outward in the vehicle width direction to have the V-shape. Along with such deformation, each of the side duct sections 44, 46 and the upper duct section 40 in respective one of the two engagement sections 54 can further effectively be disengaged from each other.

According to this embodiment, the recessed section 56 of each of the side duct sections 44, 46 in the duct member 28 is formed at substantially the same height position as the bumper reinforcement 20 in the vehicle vertical direction of respective one of the side duct sections 44, 46. Thus, it is possible to effectively transmit the collision load, which is input from the bumper reinforcement 20, to the recessed section 56 of each of the side duct sections 44, 46. In this way, each of the side duct sections 44, 46 can further reliably be deformed outward in the vehicle width direction to have the V-shape.

DESCRIPTION OF REFERENCE SIGNS AND NUMERALS

1 Vehicle
8 Bumper fascia
10 Front grille
18 Crash can
20 Bumper reinforcement
22 Radiator
26 Radiator shroud
28 Duct member
30 Grill reinforcement
32 Load transmission member
34 Seal member
40 Upper duct section
42 Lower duct section
44 Left side duct section
46 Right side duct section
48 Lower side section of the side duct section
48a Frame section
48b Inner surface section, rubber-made plane member
50 Upper side section of side duct section
50a Frame section
50b Inner surface section, rubber-made plane member
50c Engagement vertical wall portion
52 Notch
54 Engagement section
56 Recessed section
56a Ridgeline of recessed section

The invention claimed is:

1. A vehicle front body structure comprising:
a right and left pair of crash cans, each of which extends in a vehicle longitudinal direction;
a radiator that is provided on an inner side in a vehicle width direction of the right and the left pair of crash cans; and
a duct that surrounds the radiator on the inner side in the vehicle width direction of the right and left pair of crash cans, wherein
the duct completely surrounds the radiator and has a vertical wall section and a transverse wall section,
the vertical wall section and the transverse wall section of the duct have at least one engagement section in which the vertical wall section and the transverse wall section are engaged with and connected to each other, and
the vertical wall section and the transverse wall section of the duct are connected such that, when the duct receives a specified load from a bumper of a body during a frontal collision, the vertical wall section and the transverse wall section are disengaged from each other in the at least one engagement section, wherein
the transverse wall section of the duct is formed with at least one notch that is opened rearward, and
the at least one engagement section is configured by engaging a part of the vertical wall section with the notch of the transverse wall section.

2. The vehicle front body structure according to claim 1, wherein
the vertical wall section of the duct includes: a frame section; and an inner surface section having lower strength than the frame section, and a part of the frame section of the vertical wall section is connected to the transverse wall section in a manner to be disengaged therefrom in the at least one engagement section.

3. The vehicle front body structure according to claim 2, wherein
the vertical wall section of the duct is formed with a recessed section that is formed with a ridgeline in a manner to extend outward in the vehicle width direction.

4. The vehicle front body structure according to claim 3, wherein
the bumper of the body includes a bumper reinforcement that extends in the vehicle width direction on a front surface of a vehicle, and
in a vehicle vertical direction of the vertical wall section, the recessed section of the vertical wall section of the duct is formed at substantially the same height position as the bumper reinforcement.

5. The vehicle front body structure according to claim 1, wherein
the vertical wall section of the duct includes: a frame section; and an inner surface section having lower strength than the frame section, and a part of the frame section of the vertical wall section is connected to the transverse wall section in a manner to be disengaged therefrom in the at least one engagement section.

6. The vehicle front body structure according to claim 1, wherein
the vertical wall section of the duct is formed with a recessed section that is formed with a ridgeline in a manner to extend outward in the vehicle width direction.

7. A vehicle front body structure comprising:
a right and left pair of crash cans, each of which extends in a vehicle longitudinal direction;
a radiator that is provided on an inner side in a vehicle width direction of the right and the left pair of crash cans; and
a duct that surrounds the radiator on the inner side in the vehicle width direction of the right and left pair of crash cans, wherein
the duct completely surrounds the radiator and has a vertical wall section and a transverse wall section,
the vertical wall section and the transverse wall section of the duct have at least one engagement section in which the vertical wall section and the transverse wall section are engaged with and connected to each other, and
the vertical wall section and the transverse wall section of the duct are connected such that, when the duct receives a specified load from a bumper of a body during a frontal collision, the vertical wall section and the transverse wall section are disengaged from each other in the at least one engagement section, wherein
the vertical wall section of the duct includes: a frame section; and an inner surface section having lower strength than the frame section, and a part of the frame section of the vertical wall section is connected to the transverse wall section in a manner to be disengaged therefrom in the at least one engagement section.

8. A vehicle front body structure comprising:
a right and left pair of crash cans, each of which extends in a vehicle longitudinal direction;
a radiator that is provided on an inner side in a vehicle width direction of the right and the left pair of crash cans; and
a duct that surrounds the radiator on the inner side in the vehicle width direction of the right and left pair of crash cans, wherein the duct completely surrounds the radiator and has a vertical wall section and a transverse wall section, the vertical wall section and the transverse wall section of the duct have at least one engagement section in which the vertical wall section and the transverse wall section are engaged with and connected to each other, and the vertical wall section and the transverse wall section of the duct are connected such that, when the duct receives a specified load from a bumper of a body during a frontal collision, the vertical wall section and the transverse wall section are disengaged from each other in the at least one engagement section, wherein the vertical wall section of the duct is formed with a recessed section that is formed with a ridgeline in a manner to extend outward in the vehicle width direction.

* * * * *